(12) United States Patent
Dong et al.

(10) Patent No.: US 8,039,791 B2
(45) Date of Patent: Oct. 18, 2011

(54) DOWNHOLE FLUID SPECTROSCOPY

(75) Inventors: Chengli Dong, Sugar Land, TX (US);
Oliver C. Mullins, Ridgefield, CT (US);
Micheal O'Keefe, Tasmania (AU)

(73) Assignee: Schlumberger Technology Corporation, Sugar Land, TX (US)

( * ) Notice: Subject to any disclaimer, the term of this patent is extended or adjusted under 35 U.S.C. 154(b) by 359 days.

(21) Appl. No.: 12/436,898

(22) Filed: May 7, 2009

(65) Prior Publication Data
US 2010/0282959 A1    Nov. 11, 2010

(51) Int. Cl.
*G01V 5/08* (2006.01)
(52) U.S. Cl. .................................... 250/269.1
(58) Field of Classification Search .......... 250/253–268, 250/269.1–269.8
See application file for complete search history.

(56) References Cited

U.S. PATENT DOCUMENTS

| | | | |
|---|---|---|---|
| 6,939,717 B2 | 9/2005 | Jiang et al. | |
| 6,992,768 B2 | 1/2006 | Dong et al. | |
| 7,095,012 B2 | 8/2006 | Fujisawa et al. | |
| 7,336,356 B2 | 2/2008 | Vannuffelen et al. | |
| 7,362,422 B2 | 4/2008 | DiFoggio et al. | |
| 2004/0178336 A1* | 9/2004 | DiFoggio | 250/269.1 |
| 2006/0142955 A1 | 6/2006 | Jones et al. | |
| 2007/0013911 A1 | 1/2007 | DiFoggio | |
| 2008/0030729 A1 | 2/2008 | DiFoggio | |
| 2008/0078544 A1 | 4/2008 | Christian et al. | |
| 2008/0173445 A1 | 7/2008 | Dong et al. | |

FOREIGN PATENT DOCUMENTS

WO    WO2007143474    12/2007

OTHER PUBLICATIONS

Bykov, A.D. et al., The Infrared Spectrum of H2S from 1 to 5 um, Can. J. Phys., vol. 72, p. 989 (1994).
US 7,456,958, 11/2008, DiFoggio (withdrawn)

* cited by examiner

*Primary Examiner* — Kiho Kim
(74) *Attorney, Agent, or Firm* — David J Smith

(57) ABSTRACT

An example method for determining a partial density of a compound in a downhole fluid may comprise exposing the downhole fluid to an electromagnetic radiation, and measuring a spectrum of radiation absorption by the downhole fluid. An absorption peak of the compound may be identified in the measured spectrum. A first parameter indicative of radiation absorption by the downhole fluid may be determined in the identified absorption peak. Second and third parameters indicative of radiation absorptions by the downhole fluid may be determined essentially out of the identified absorption peak. A weighted combination of the second and third parameters may be computed, and the partial density of the compound may be determined from a difference between the weighted combination and the first parameter.

20 Claims, 8 Drawing Sheets

DOWNHOLE FLUID SPECTROSCOPY

BACKGROUND OF THE DISCLOSURE

It is conventional to investigate the characteristics of downhole fluids contained in underground formations by taking samples and analyzing the samples in a laboratory or in situ. In particular, downhole fluid characteristics may include partial densities of one or more compounds in the downhole fluid.

Some methods and apparatuses utilize spectrometers to determine a partial density of one or more compounds in the downhole fluid. For example, measured downhole fluid spectra may exhibit absorption peaks associated with the presence of a compound. Absorption peak amplitudes may be used to determine the partial density of the compound. Descriptions of methods or apparatuses for determining the partial density of one or more compounds in downhole fluid may be found, for example, in U.S. Pat. Nos. 7,336,356; 7,362,422; and 7,456,958; U.S. Patent Application Pub. No. 2008/0078544; and PCT Patent Application Pub. No. 2007/143474, the disclosures of which are incorporated herein by reference.

In some cases, absorption peak amplitudes may be biased by factors other than the absorption by the compound associated with the absorption peak. It may be desirable to account for the bias when determining the partial density of the compound. Examples of such methods are described in U.S. Pat. Nos. 6,992,768; and 7,095,012; and U.S. Patent Application Pub. No. 2008/0173445, the disclosures of which are incorporated herein by reference.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
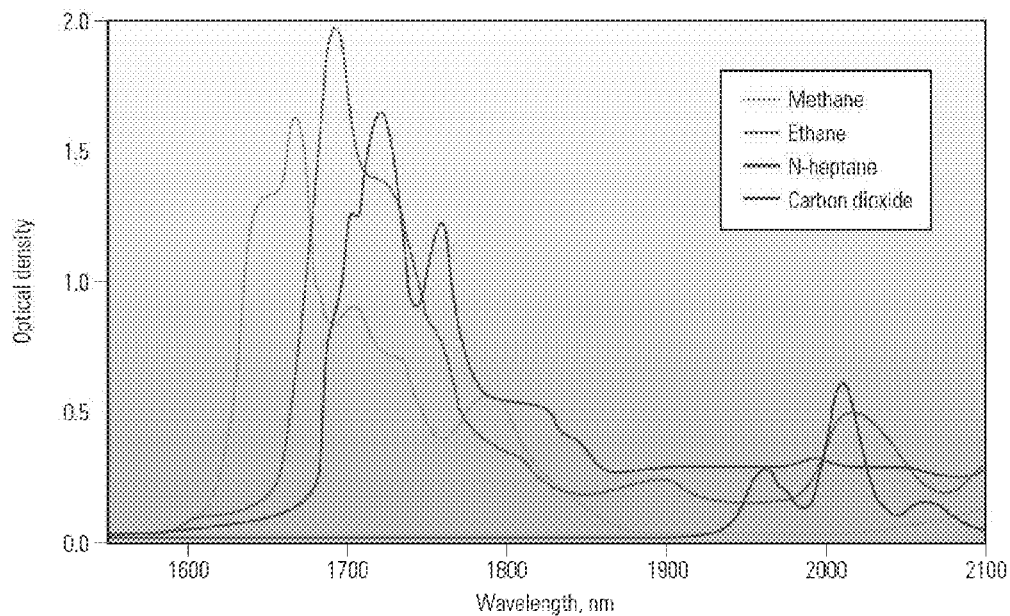
FIG. 1 is a graph of known absorption spectra of fluids that may be encountered downhole.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Methods and apparatuses for analyzing downhole fluids are disclosed herein. The methods and apparatuses of the present disclosure may be used to determine partial densities of compounds present in downhole fluid samples extracted from a subterranean formation into which a well has been drilled.

Turning to FIG. 1, radiation absorption spectra of methane ($CH_4$), ethane ($C_2H_6$), N-heptane ($C_7H_{16}$), and carbon dioxide ($CO_2$) are shown. The abscissa of the graph in FIG. 1 is the wavelength of the radiation, expressed in nanometers (nm). The ordinate of the graph in FIG. 1 is the optical density (OD), sometimes referred to as the absorbance. As is well known in the art, a large optical density is indicative of radiation absorption.

As apparent in FIG. 1, one or more absorption peaks associated with a particular compound may be identified in the spectra. In the shown example, methane exhibits an absorption peak for example at wavelengths around 1650 to 1670 nm. Ethane exhibits an absorption peak for example at wavelengths around 1690 nm, and 2025 nm. N-heptane exhibits an absorption peak for example at wavelengths around 1720 nm, and 1760 nm. Carbon dioxide also exhibits absorption peaks for example at wavelengths around 1965 nm, 2010 nm, and 2065 nm. The absorption peaks may correspond to molecular vibration absorption, as is well known in the art.

The graphs shown in FIG. 1 may be used to estimate the absorption spectrum of a mixture of hydrocarbon (e.g., methane, ethane, N-heptane, mixtures thereof) and carbon dioxide, for example, by using the Beer-Lambert law as is well known in the art. The absorption spectrum of the mixture of the hydrocarbon and carbon dioxide may still exhibit absorption peaks around 1965 nm, 2010 nm, and 2065 nm, associated with the carbon dioxide present in the mixture. As apparent in FIG. 1, the absorption spectra of the hydrocarbon and carbon dioxide may overlap. Thus, the amplitude of the absorption peaks around 1965 nm, 2010 nm, and 2065 nm may be biased by absorption caused by compounds present in the mixture (such as methane, ethane, N-heptane, mixtures thereof, etc), other than carbon dioxide. When determining the partial density of carbon dioxide in the mixture of hydrocarbon and carbon dioxide, it may be desirable to account for the bias, as further described hereinafter.

Figure 2:
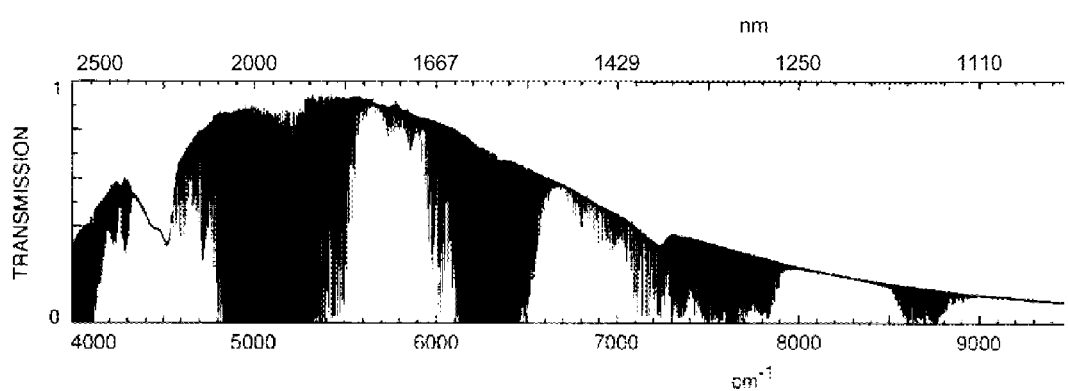
FIG. 2 is a graph of a known absorption spectrum of hydrogen sulfide.

Turning to FIG. 2, a radiation absorption spectrum of a hydrogen sulfide ($H_2S$) sample in a measurement cell is shown. For convenience, the abscissa of the graph in FIG. 2 reports the wave number of the radiation (bottom), expressed in inverse centimeters ($cm^{-1}$) and the wavelength of the radiation, expressed in nanometers (nm). The ordinate of the graph in FIG. 2 reports the transmission (T), sometimes referred to as the transmittance. As is well known in the art, a low transmission is indicative of radiation absorption. In the illustrated graph, the H2S sample is at low pressure (0.6 psi) and at room temperature (289° K). The optical path length of the measurement cell is 433 meters. Further, the spectrum shown in FIG. 1 is obtained with a high-resolution infrared spectrometer, thus detailed individual absorption peaks caused by vibrational and/or rotational excitation modes of H2S molecules may be detected.

As apparent in FIG. 2, hydrogen sulfide usually exhibits transmission levels lower than 1 (that is, some level of radiation absorption) in the shown wavelength range. Also, at some particular wavelength intervals, such as, for example, wavelength intervals centered around 1200 nm (e.g., in a range between 1150 nm and 1180 nm), 1300 nm (e.g., in a range between 1280 nm and 1370 nm), 1600 nm (e.g., in a range between 1530 nm and 1615 nm), 1900 nm (e.g., in a range between 1820 nm and 2180 nm), 2600 nm (e.g., in a range between 2460 and 2860 nm), hydrogen sulfide has closely spaced individual absorption peaks that may be caused by vibrational and/or rotational excitation modes of H2S molecules. At higher pressures (e.g., at pressures higher than 500 psi) nearby individual absorption peaks may merge together and may form one absorption peak, which in some cases are similar to the absorption peaks of carbon dioxide shown in FIG. 1. Further, when a low-resolution spectrometer is used, nearby individual absorption peaks may not be individually detected and may appear as one absorption peak, also similar in some cases to the absorption peaks of carbon dioxide shown in FIG. 1.

The graphs shown in FIGS. 1 and 2 may be used to estimate the absorption spectrum of a mixture of hydrocarbon (e.g., methane, ethane, N-heptane, mixtures thereof) and hydrogen sulfide, for example, by using the Beer-Lambert law as is well known in the art. The absorption spectrum of the mixture of the hydrocarbon and hydrogen sulfide may still exhibit absorption peaks around 1200 nm, 1300 nm, 1600 nm, 1900 nm, or 2600 nm, associated with the hydrogen sulfide present in the mixture. As apparent in FIGS. 1 and 2, the absorption spectra of the hydrocarbon and hydrogen may overlap. Thus, the amplitude of the absorption peaks around 1200 nm, 1300 nm, 1600 nm, 1900 nm, or 2600 nm may be biased by absorption caused by compounds present in the mixture (such as methane, ethane, N-heptane, mixtures thereof, etc.), other than hydrogen sulfide. When determining the partial density of hydrogen sulfide in the mixture of hydrocarbon and hydrogen sulfide, it may be desirable to account for the bias, as further described hereinafter.

Downhole fluids may be made of a plurality of compounds such as methane, ethane, propane, butane, hexane, heptane, octane, hydrogen sulfide, water, carbon dioxide, nitrogen, sulfate, helium, and dead crude oils. Further, downhole fluids may comprise contaminants, such as drilling fluids (e.g., diesel, water based mud, etc.), and solid particles. It is conventional to analyze at least partially the composition of downhole fluids. For example, partial densities of one or more compounds in the downhole fluid may be determined. When determining the partial density of one or more compounds in the downhole fluid using spectroscopic methods, it may be desirable to account for bias of spectral amplitude that may be caused by the absorption mechanisms discussed in relation to FIGS. 1 and 2, or other mechanisms, for example, electronic absorption by aromatic molecules present in the downhole fluid, radiation scattering by solid particles in the downhole fluid, etc.

Figure 3:
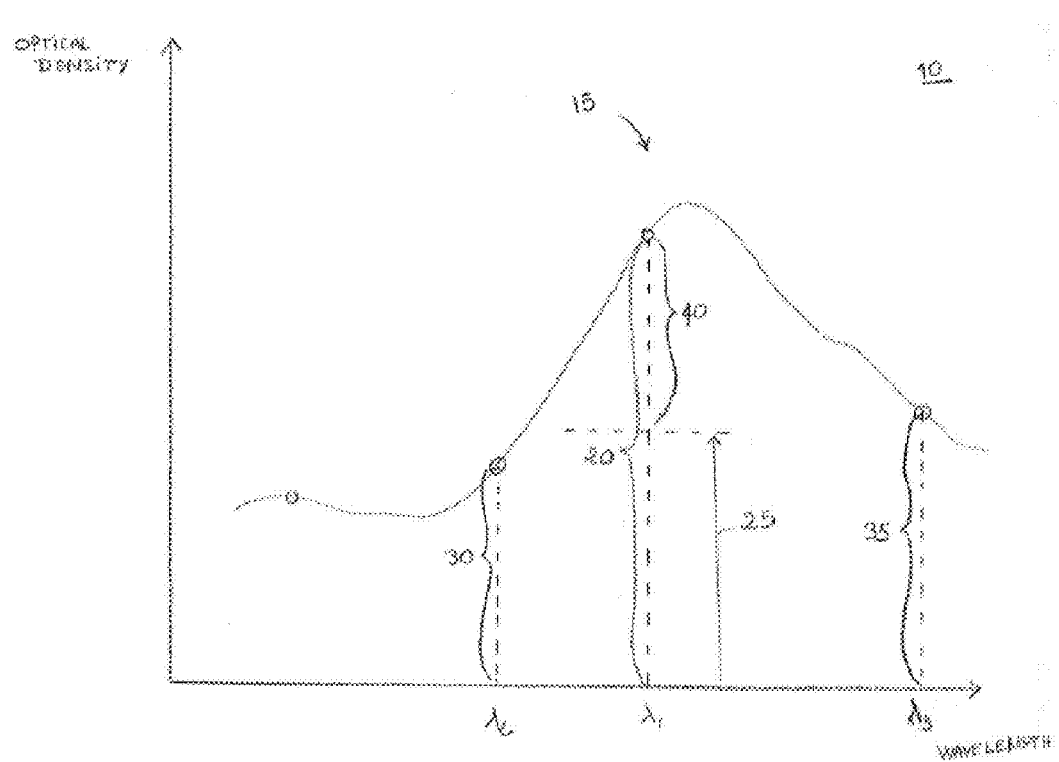
FIG. 3 is a graph of an absorption spectrum according to one or more aspects of the present disclosure.

In reference to the graph shown in FIG. 3, downhole fluids may be exposed to an electromagnetic radiation, and a spectrum of radiation absorption 10 by the downhole fluid may be measured. According to the present disclosure, an absorption peak 15 of a compound may be identified in the measured spectrum, the compound having a partial density in the downhole fluid. The compound may be a pure chemical substance or a combination of pure chemical substances. A first parameter 20 indicative of radiation absorption by the downhole fluid may be determined in the identified absorption peak. In some cases, the value of the first parameter may be biased by factors other than the absorption by the compound associated with the absorption peak. A bias 25 may be estimated by determining second and third parameters, respectively 30 and 35, indicative of radiation absorptions by the downhole fluid essentially out of the identified absorption peak, and by computing a weighted combination of the second and third parameters. When determining the partial density of the compound, the bias may be accounted for by using a difference 40 between the weighted combination and the first parameter.

The applicants conducted experiments on downhole fluids, including life and dead oils, flashed gases, heavy gases; mixtures of downhole fluids such as dead oils at least partially recombined with natural or flashed gases; as well as mixtures of compounds encountered in downhole fluids (such as water, diesel, pure methane, and pure carbon dioxide). These experimental fluids were exposed to an electromagnetic radiation, and spectra of radiation absorption by the experimental fluids were measured. Partial densities of carbon dioxide in the experimental fluids were determined using methods according to the present disclosure. The partial density of carbon dioxide determined using methods according to the present disclosure was compared to the partial density of carbon dioxide determined using a reference method (such as gas chromatography). The applicants determined that the partial density of carbon dioxide determined using methods according to the present disclosure was in good agreement with the partial density of carbon dioxide determined using the reference method. Differences of the partial density of the carbon dioxide were in the range of at most 2% by weight. In addition, the partial density of carbon dioxide determined using spectroscopy methods of the prior art was also compared to the partial density of carbon dioxide determined using the reference method. Differences of the partial density of the carbon dioxide were in this case in the range of 10% by weight, therefore in less agreement with the partial density of carbon dioxide determined using the reference method than the partial density of carbon dioxide determined using methods according to the present disclosure.

Further, the methods according to the present disclosure may be applicable to determine partial densities of compounds other than carbon dioxide. The compounds include, but are not limited to, methane, ethane, propane, butane, hexane, heptane, octane, hydrogen sulfide, water, carbon dioxide, nitrogen, sulfate, helium, and combinations thereof.

Figure 4:
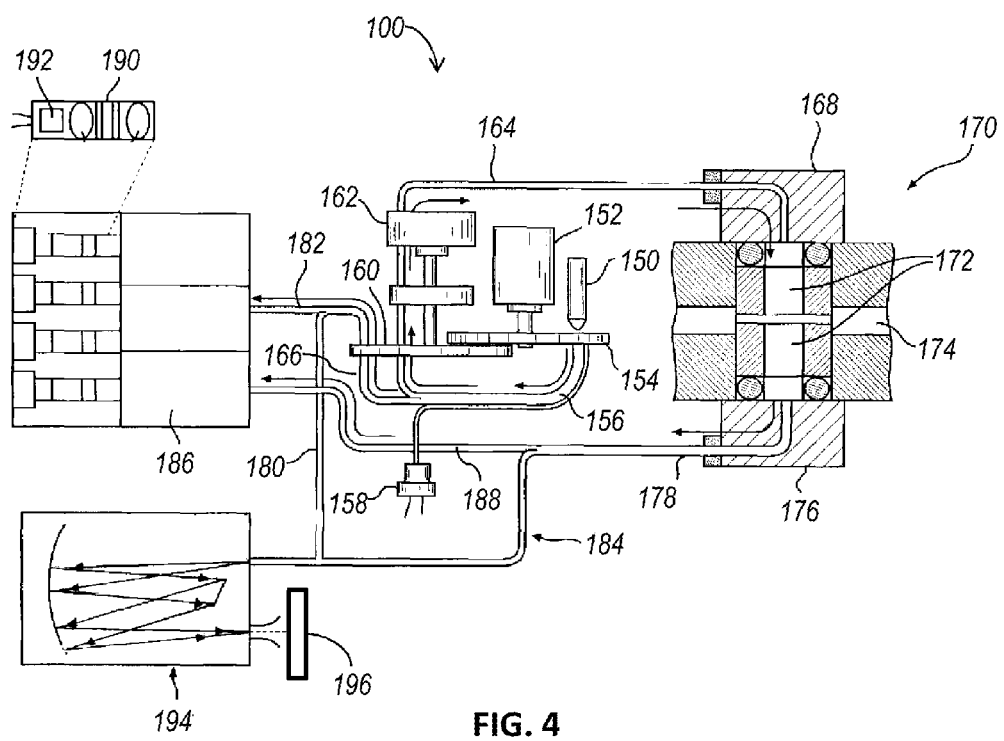
FIG. 4 is a schematic view of a spectral analysis system according to one or more aspects of the present disclosure.

Turning to FIG. 4, a schematic representation of an example of a spectral analysis system 100 according to one or more aspects of the present disclosure is shown. The spectral analysis system 100 may comprise any combination of high-resolution and low-resolution spectrometers. For example, the spectral analysis system 100 may comprise a filter array spectrometer 186, and/or a grating spectrometer 194. The filter array spectrometer 186 and/or the grating spectrometer 194 may be configured to measure an absorption spectrum of a downhole fluid disposed in a spectrometer cell 170 of the spectral analysis system 100. The downhole fluid disposed in the spectrometer cell 170 may be at any pressure, for example at low pressure (such as a fraction of one psi) or at high pressure (such as a pressure higher than 500 psi).

The filter array spectrometer 186 may comprise a plurality of band pass filters (such as band pass filter 190) feeding to photodiodes (such as photodiode 192). The filters may be chosen to select predetermined wavelengths of light and provide an output signal relative to the wavelength in question.

The filers may have different bandwidths, such as 15 nm to 20 nm bandwidth. For the purpose of this example, only four filters are shown, but up to twenty filters may be available. For example, the predetermined wavelengths may comprise a first wavelength located in an absorption peak of at least one of methane, ethane, propane, butane, hexane, heptane, octane, hydrogen sulfide, water, carbon dioxide, nitrogen, sulfate, helium, and combination thereof, a second wavelength substantially shorter than the first wavelength; and a third wavelength substantially longer than the first wavelength. However, the second wavelength may alternatively be substantially longer than the first wavelength and/or the third wavelength may alternatively be substantially shorter than the first wavelength.

In addition to the filter array spectrometer 186, a grating spectrometer 194 may also be provided. The grating spectrometer 194 may be of a type described, for example, in U.S. Pat. No. 7,511,813, incorporated herein by reference. However, other types of grating spectrometers may be used to implement the grating spectrometer 194 or portions thereof within the scope of the present disclosure. The grating spectrometer 194 may include a photo detector array 196, operatively coupled thereto. The photo detector array 196 may be configured to filter predetermined wavelengths of light and provide an output signal relative to the wavelength in question. For example, the photo detector array 196 may have different filter bandwidths, such as 15 nm bandwidth or 20 nm bandwidth. The grating spectrometer 194 and/or the photo detector array 196 may be configured to measure radiation absorption by the downhole fluid disposed in the spectrometer cell 170 at wavelengths located in one or more absorption peaks associated with at least one of methane, ethane, propane, butane, hexane, heptane, octane, hydrogen sulfide, water, carbon dioxide, nitrogen, sulfate, helium, and combinations thereof. The grating spectrometer 194 and/or the photo detector array 196 may further be configured to measure radiation absorption by the downhole fluid at wavelengths located essentially out of the at least one absorption peak mentioned above.

A light source 150 may emit light, for example in the visible and/or in the infrared region. The light may pass through a chopper wheel 154 driven by a chopper motor 152 into an optical fiber bundle 156. Light outputs may be taken from the optical fiber bundle 156 to provide input to a motor synchronization photodiode 158, a calibration fiber bundle 166, and a measurement input fiber bundle 164. A calibration wheel 160 driven by a rotary solenoid switch 162 may select whether light passes into the calibration fiber bundle 166, or the measurement input fiber bundle 164.

The light carried in the calibration fiber bundle 166 may be provided directly from the light source 150 to the spectrometers, and may be used to generate reference signals to be used for spectrometer calibration. For example, the calibration fiber bundle 166 may be split into optical fiber bundles 180 and 182, and the light carried into the optical fiber bundles 180 and 182 may be introduced into the grating spectrometer 194 and the filter array spectrometer 186, respectively.

The light carried in the measurement input fiber bundle 164 may be provided to the downhole fluid disposed in the spectrometer cell 170. For example, the measurement input fiber bundle 164 may connect to an input flange 168 of the spectrometer cell 170 and optically connects to a window 172. Light may be transmitted from the window 172, across a flow path 174 containing the downhole fluid therein, through another window 172, and into a measurement output fiber bundle 178 connected to an output flange 176.

The light signal carried in the measurement output fiber bundle 178 may be provided from the spectrometer cell 170 to one or more of the spectrometers, and may be used to generate measurement signals to be used for measuring the absorption spectrum of the downhole fluid disposed in the spectrometer cell 170. For example, the measurement output fiber bundle 178 may be split into optical fiber bundles 184 and 188, and the light carried into the optical fiber bundles 184 and 188 may be introduced into the grating spectrometer 194 and the filter array spectrometer 186, respectively.

In operation, the signal provided by the motor synchronization photodiode 158 may be used to modulate the light directed at the spectrometers 186 and/or 194 at a constant frequency, for example 500 Hz. The calibration wheel 160 may be driven by the rotary solenoid switch 162 to selectively pass light emitted by the light source 150 into the calibration fiber bundle 166, or the measurement input fiber bundle 164. When the light passes into the calibration fiber bundle 166, the grating spectrometer 194 and/or the filter array spectrometer 186 may be used to generate reference signals to be used for spectrometer calibration. For example, the grating spectrometer 194 and/or the filter array spectrometer 186 may be used to monitor an intensity spectrum of the incident light emitted by the light source 150, $I_0(\lambda)$, at a plurality of wavelengths $\lambda$. The plurality of wavelengths $\lambda$ may be determined from the characteristics of the grating spectrometer 194 and/or the filter array spectrometer 186 (e.g., the characteristics of the band pass filters such as the band pass filter 190 and/or the characteristics of the photo detector array 196). When the light passes into the measurement input fiber bundle 164, the grating spectrometer 194 and/or the filter array spectrometer 186 may be used to generate measurement signals to be used for measuring the absorption spectrum of the downhole fluid disposed in the spectrometer cell 170. For example, the grating spectrometer 194 and/or the filter array spectrometer 186 may be used to monitor an intensity spectrum of the light transmitted through the spectrometer cell 170, $I(\lambda)$, at the plurality of wavelengths $\lambda$. A transmission spectrum $T(\lambda)$, may be computed as the ratio of transmitted light intensity $I(\lambda)$ to that of incident light intensity $I_0(\lambda)$. An optical density spectrum $OD(\lambda)$, indicative of the radiation absorption by the downhole fluid at the plurality of wavelengths $\lambda$, may further be computed as:

$$OD(\lambda) = -\log_{10}(T(\lambda))$$

The measured optical density spectrum $OD(\lambda)$ may be used to determine a partial density of a compound of the downhole fluid disposed in the spectrometer cell 170, such as a partial density of one or more of methane, ethane, propane, butane, hexane, heptane, octane, hydrogen sulfide, water, carbon dioxide, nitrogen, sulfate, helium, and combinations thereof, as further described hereinafter.

Figure 5:
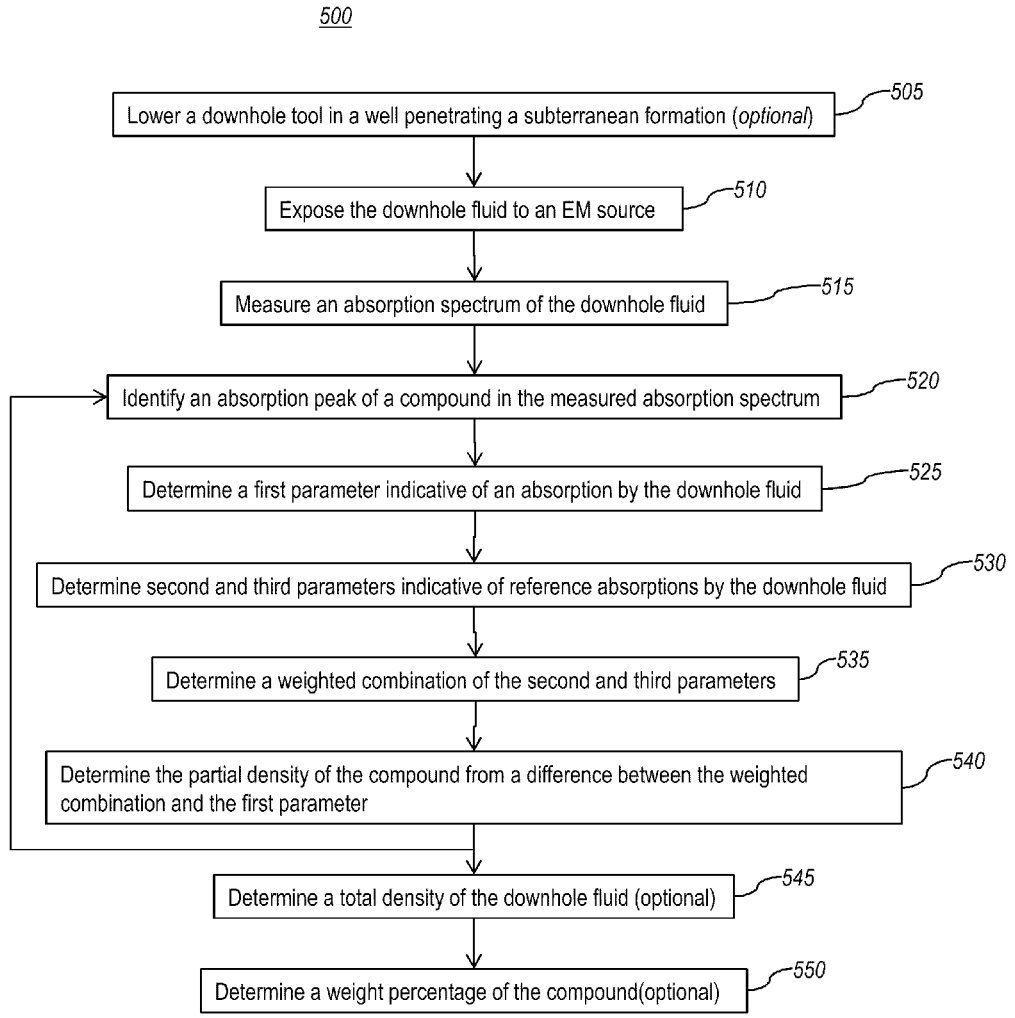
FIG. 5 is a flow chart of at least a portion of a method of analyzing downhole fluids according to one or more aspects of the present disclosure.

FIG. 5 is a flow chart of at least a portion of a method 500 of analyzing a downhole fluid according to one or more aspects of the present disclosure is shown. The downhole fluid may include a compound having a partial density. The compound may be a pure chemical substance or a combination of pure chemical substances. The compound may comprise one of methane, ethane, propane, butane, hexane, heptane, octane, hydrogen sulfide, water, carbon dioxide, nitrogen, sulfate, helium, or combinations thereof.

Referring to FIGS. 4 and 5 collectively, at step 505, a downhole tool may optionally be lowered in a well penetrating a subterranean formation. For example, the downhole tool may be lowered in the well via one of a tubing, a drill pipe, and a wireline, as further described hereinafter. A downhole fluid sample may be extracted from the formation into the downhole tool. For example, the downhole tool may be used to extract formation fluid from the formation using a pump, for example until an acceptable or suitable level of contamination of the formation fluid by mud filtrate is achieved. In some cases, fluid collecting chambers may be used to receive and retain at least a portion of the extracted formation fluid for subsequent testing at the surface or a testing facility. The fluid collecting chambers may be brought to the Earth's surface and the downhole fluid samples therein may be analyzed in a laboratory. In some cases, downhole fluid samples may be analyzed in situ. For example, the downhole tool may comprise a spectral analysis system having an electro-magnetic source and a spectrometer sensitively coupled to a downhole fluid sample extracted from the formation into the downhole tool.

At step 510, a downhole fluid sample may be exposed to an electro-magnetic radiation. For example, the downhole fluid sample may be exposed to a light source. The light source may be configured to emit light in at least one of the infrared region and the visible region. However, the electro-magnetic radiation may not be limited to light, and the electro-magnetic radiation frequency or wavelength may include one or more of radio waves, microwaves, terahertz radiation, infrared radiation, visible light, ultraviolet radiation, and soft X-rays within the scope of the present disclosure. As shown in the example spectral analysis system 100 of FIG. 4, the light may be provided by the light source 150. The measurement input fiber bundle 164 may be used to carry the light to the downhole fluid sample disposed in the spectrometer cell 170.

At step 515, a spectrum of radiation absorption by the downhole fluid may be measured. For example, an optical absorption spectrum may be measured. As shown in the example spectral analysis system 100 of FIG. 4, the grating spectrometer 194 and/or the filter array spectrometer 186 may be used to generate one or more optical density spectra $OD(\lambda)$, indicative of the light absorption at a plurality of wavelengths $\lambda$. The plurality of wavelengths $\lambda$ may be determined from the characteristics of the filter array 186 and/or the grating spectrometer 194. For example, the plurality of wavelengths $\lambda$ may span a wavelength interval between 400 nm and 3500 nm, covering the range of visible and infrared light. The plurality of wavelengths may be distributed over the wavelength interval as desired. For example, one or more of the plurality of wavelengths may be located in one or more absorption peaks associated with at least one of methane, ethane, propane, butane, hexane, heptane, octane, hydrogen sulfide, water, carbon dioxide, nitrogen, sulfate, helium, or combinations thereof. In addition, two or more of the plurality of the wavelengths may be located essentially out of the one or more absorption peaks mentioned above.

At step 520, an absorption peak of the compound may be identified in the spectrum of radiation absorption measured at step 515. Absorption peaks located at one or more wavelengths (e.g., wavelengths in the infrared region) may be associated with compounds in the downhole fluid. For example, an absorption peak located around 1925 nm, 2010 nm or 2065 nm may be associated with carbon dioxide present in the downhole fluid. Further, one or more of absorption peaks located around 1200 nm, 1300 nm, 1600 nm, 1900 nm, 2600 nm, 3700 nm or 4200 nm may be associated with hydrogen sulfide present in the downhole fluid.

At step 525, a first parameter indicative of an absorption by the downhole fluid in the identified absorption peak may be determined. For example, an intensity of the incident light emitted by a light source, $I_0(\lambda_1)$, may be measured at a first wavelength $\lambda_1$ located in the identified absorption peak, and over a bandwidth of 15 to 20 nm. An intensity of the light transmitted through the downhole fluid, $I(\lambda_1)$, may also be measured at the first wavelength $\lambda_1$, and over the same bandwidth. A transmission $T(\lambda_1)$ may be computed as the ratio of transmitted light intensity $I(\lambda_1)$ to that of incident light intensity $I_0(\lambda_1)$. Further, an optical density $OD(\lambda_1)$, indicative of the radiation absorption by the downhole fluid, may be computed from the transmission $T(\lambda_1)$. Alternatively, or additionally, the first parameter indicative of the absorption by the downhole fluid in the identified absorption peak may be determined from a combination of transmissions $T(\lambda)$ measured at a plurality of wavelengths $\lambda$ located in a wavelength range of the identified absorption peak.

At step 530, second and third parameters indicative of absorptions by the downhole fluid essentially out of the absorption peak identified at step 525 may be determined. However, three or more parameters indicative of absorptions by the downhole fluid essentially out of the absorption peak identified at step 525 may be determined. For example, an intensity of the incident light emitted by a light source, $I_0(\lambda_2)$, may be measured at a second wavelength $\lambda_2$ substantially shorter than the first wavelength $\lambda_1$, and over a bandwidth of 15 to 20 nm. An intensity of the light transmitted through the downhole fluid, $I(\lambda_2)$, may also be measured at the second wavelength $\lambda_2$, and over the same bandwidth. A transmission $T(\lambda_2)$, may be computed as the ratio of transmitted light intensity $I(\lambda_2)$ to that of incident light intensity $I_0(\lambda_2)$. Further, a first reference optical density spectrum $OD_{r1}(\lambda_2)$, indicative of the radiation absorption by the downhole fluid, may be computed from the transmission $T(\lambda_2)$. The second wavelength $\lambda_2$ may differ from the first wavelength $\lambda_1$ by at least about 20 nm. Alternatively, the second wavelength can be selected at a wavelength where the absorption peak identified in Step 525 reduces to 50% or less. Similarly, a second reference optical density spectrum $OD_{r2}(\lambda_3)$, indicative of the radiation absorption by the downhole fluid at a third wavelength $\lambda_3$ substantially longer than the first wavelength $\lambda_1$, may also be determined. The third wavelength $\lambda_3$ may differ from the first wavelength $\lambda_1$ by at least 20 nm. Alternatively, the second wavelength can be selected at a wavelength where the absorption peak identified in Step 525 reduces to 50% or less. It should be noted however that both the second and third wavelengths $\lambda_2$ and $\lambda_3$ may alternatively be substantially shorter or longer than the first wavelength $\lambda_1$. Alternatively, or additionally, the second and third parameters indicative of absorptions by the downhole fluid may be determined from a combination of transmissions $T(\lambda)$ measured at a plurality of wavelengths located essentially out of the absorption peak identified at step 520.

In cases where the downhole fluid is analyzed to determine a partial density of hydrogen sulfide, the first, second and third wavelengths may be selected according to Table 1 below. For illustration purposes, the first wavelength $\lambda_1$ may be in the range between 2460 nm and 2860 nm, the second wavelength $\lambda_2$ may be in the range between 2180 nm and 2380 nm, and the third wavelength $\lambda_3$ may be in the range between 2950 nm and 3330 nm. In some cases, only wavelengths having low or no molecular vibration absorption by hydrocarbon molecules may be used. For example, only wavelengths below approximately 1615 nm may be used.

TABLE 1

| $\lambda_1$ | $\lambda_2$ | $\lambda_3$ |
|---|---|---|
| 1150 nm-1180 nm | 1000 nm-1130 nm | 1180 nm-1270 nm |
| 1280 nm-1370 nm | 1180 nm-1270 nm | 1390 nm-1520 nm |
| 1530 nm-1615 nm | 1390 nm-1520 nm | 1615 nm-1820 nm |

TABLE 1-continued

| $\lambda_1$ | $\lambda_2$ | $\lambda_3$ |
|---|---|---|
| 1820 nm-2180 nm | 1615 nm-1820 nm | 2180 nm-2380 nm |
| 2460 nm-2860 nm | 2180 nm-2380 nm | 2950 nm-3330 nm |

In the cases where the downhole fluid is analyzed to determine a partial density of carbon dioxide, the first, second and third wavelengths may be selected according to Table 2 below.

TABLE 2

| $\lambda_1$ | $\lambda_2$ | $\lambda_3$ |
|---|---|---|
| 2005-2020 nm | 1975-1995 nm | 2030-2055 nm |

At step 535, a weighted combination of the second and third parameters may be determined. However, a weighted combination of three or more parameters indicative of absorptions by the downhole fluid essentially out of the absorption peak may be determined within the scope of the present disclosure. The weighted combination of the second and third parameters may be used to estimate the bias of the first parameter determined at step 525 caused by factors other than the absorption by the compound in the downhole fluid. In particular, the weighted combination of the second and third parameters may estimate the bias caused by electronic absorption by aromatic molecules present in the downhole fluid and light scattering by solid particles in the downhole fluid, among other factors.

For example, a reference parameter $OD_r$ may be determined from the first and second reference optical densities determined at step 530 using the formula:

$$OD_r = \alpha OD_{r1}(\lambda_2) + \beta OD_{r2}(\lambda_3)$$

wherein $\alpha$ and $\beta$ are predetermined coefficients. For example, the values of the coefficients $\alpha$ and $\beta$ may be tuned. The values of the coefficients $\alpha$ and $\beta$ may initially be set to 0.5. Using a plurality of downhole fluids having a known concentration in the compound, c, a plurality of corresponding first parameter values may be determined in laboratory, similarly to the description of step 525. A plurality of corresponding second and third parameter values may also be determined in laboratory, similarly to the description of step 530, and a plurality of corresponding weighted combinations of second and third parameters may be obtained using the initial values of the coefficients $\alpha$ and $\beta$. A plot of the known concentration c versus the difference between the corresponding first parameter value and the corresponding weighted combination may be generated. The values of the coefficients $\alpha$ and $\beta$ may be adjusted until the generated plot represents a proportionality relationship between the known concentration c and the difference.

In some cases, the reference parameter $OD_r$ may be determined by extrapolating the second and third parameters along a line of fixed slope. In these cases, the value of the coefficient $\beta$ may be set to $\beta=1-\alpha$. For illustration purposes, if the value of the coefficient $\alpha$ is set to 0.3, the value of the coefficient $\beta$ may be set to 0.7.

At step 540, a partial density of the compound may be determined from a difference between the weighted combination determined at step 535 and the first parameter determined at step 525. For example, the partial density c of the compound may be determined using the formula:

$$c = \frac{OD(\lambda_1) - OD_r}{\varepsilon L}$$

where $\varepsilon$ is the absorptivity of the compound at the wavelength $\lambda_1$, and L is the optical path length in the downhole fluid (e.g., the distance the faces of the windows 172 of FIG. 4 in contact with the downhole fluid). The absorptivity $\varepsilon$ is typically a constant for the compound and may be determined in laboratory, as is routinely performed by those having ordinary skill in the art.

In some cases, the steps 520, 525, 530, 535 and 540 may be repeated using a different absorption peak associated with the compound in the downhole fluid. The partial density determined at step 540 may be identical to the partial density previously determined. The partial density determined at step 540 may alternatively differ from the partial density previously determined. Multiple values of partial densities obtained at step 540 and corresponding to different absorption peaks associated with the compound in the downhole fluid may be averaged, for example using a weighted average. In particular, the weights used in the weighted average may be inversely proportional to the absorptivity of the compound in each of the different absorption peaks.

At step 545, a total density may optionally be determined. For example, once the partial density of the compound c has been determined at step 540, the contribution of the compound to the absorption spectrum $OD(\lambda)$ measured at step 515 may be removed to produce an adjusted absorption spectrum $OD_{ad}(\lambda)$ using the formula:

$$OD_{ad}(\lambda) = OD(\lambda) - \varepsilon(\lambda) L c$$

where $\varepsilon(\lambda)$ is the absorptivity of the compound at the plurality of wavelengths $\lambda$. The adjusted absorption spectrum $OD_{ad}(\lambda)$ may then be used to determine the partial density of other compounds in the downhole fluid, using methods disclosed herein or other methods. The total density of the downhole fluid may be determined from the sum of the partial densities of a plurality of compounds in the downhole fluid. For example, in the case of a hydrocarbon gas having a high content of hydrogen sulfide, the total density of the downhole fluid c may be estimated with the sum of a hydrogen sulfide partial density $c_{H2S}$, a carbon dioxide partial density $c_{CO2}$, and a hydrocarbon partial density $c_{HC}$.

At step 550, a weight percentage of the compound may optionally be determined. Using the previous example, a hydrogen sulfide weight percentage $\rho_{H2S}$, a carbon dioxide weight percentage $\rho_{CO2}$, and a hydrocarbon weight percentage $\rho_{HC}$ may be determined as follows.

$$\rho_{H2S} = \frac{c_{H2S}}{c_{HC} + c_{CO2} + c_{H2S}} \times 100$$

$$\rho_{HC} = \frac{c_{HC}}{c_{HC} + c_{CO2} + c_{H2S}} \times 100$$

$$\rho_{CO2} = \frac{c_{CO2}}{c_{HC} + c_{CO2} + c_{H2S}} \times 100$$

As known in the art, the hydrogen sulfide weight percentage $\rho_{H2S}$, among other reservoir characteristics, may have a significant impact on the cost of development and/or management of the reservoir from which the downhole fluid has been extracted.

It should be appreciated that the order of execution of the steps depicted in the flow chart of FIG. 5 may be changed and/or some of the steps described may be combined, divided, rearranged, omitted, eliminated and/or implemented in other ways within the scope of the present disclosure.

Figure 6:
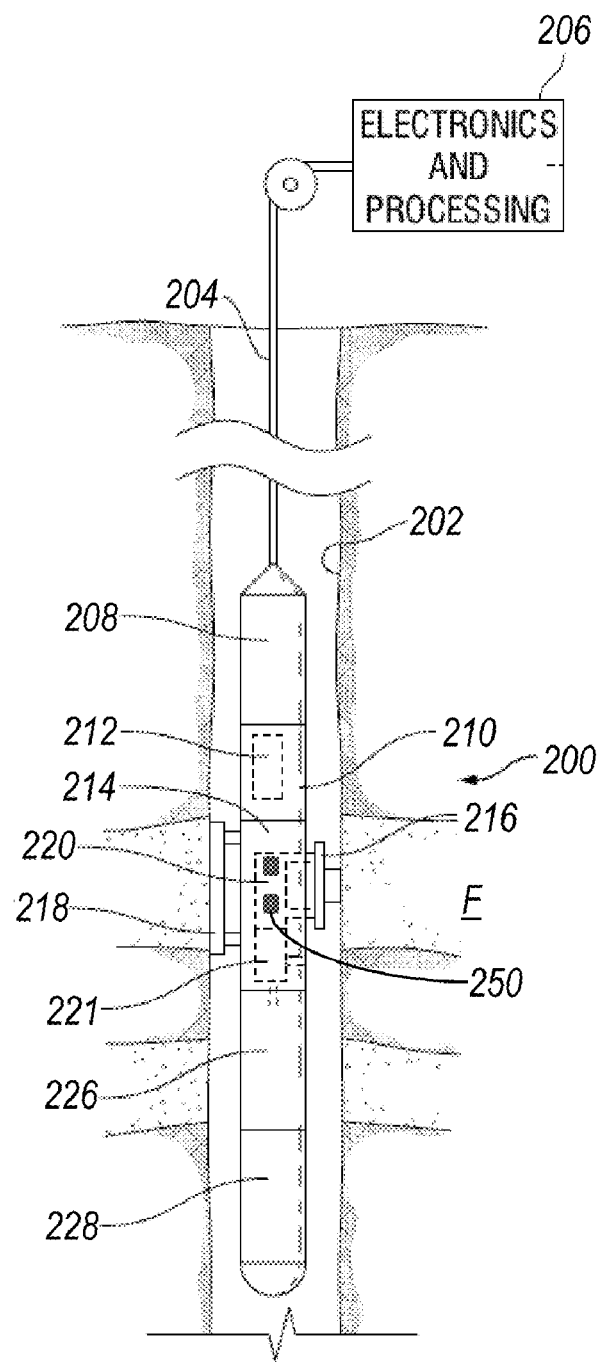
FIG. 6 is a schematic view of a fluid analysis system according to one or more aspects of the present disclosure.

Turning to FIG. 6, an example well site system according to one or more aspects of the present disclosure is shown. The well site may be situated onshore (as shown) or offshore. The well site system of FIG. 6 may be configured to perform at least a portion of the method 500 shown in FIG. 5. For example, a wireline tool 200 may be configured to determine partial densities of compounds present in downhole fluid samples extracted from a subterranean formation F into which a wellbore 202 has been drilled.

The example wireline tool 200 may be suspended in the wellbore 202 from a lower end of a multi-conductor cable 204 that may be spooled on a winch (not shown) at the Earth's surface. At the surface, the cable 204 may be communicatively coupled to an electronics and processing system 206. The electronics and processing system 206 may include a controller having an interface configured to receive commands from a surface operator. The example wireline tool 200 includes an elongated body 208 that may include a telemetry module 210, and a formation tester 214. Although the telemetry module 210 is shown as being implemented separate from the formation tester 214, in some example implementations, the telemetry module 210 may be implemented in the formation tester 214. Further, additional components may also be included in the tool 200.

The formation tester 214 may comprise a selectively extendable fluid admitting assembly 216 and a selectively extendable tool anchoring member 218 that are respectively arranged on opposite sides of the body 208. As shown, the fluid admitting assembly 216 is configured to selectively seal off or isolate selected portions of the wall of the wellbore 202, and to fluidly couple components of the formation tester 214, for example, a pump 221, to the adjacent formation F. Thus, the formation tester 214 may be used to obtain downhole fluid samples from the formation F. The formation tester 214 may also include a fluid sensing unit 220 through which the obtained downhole fluid samples flow. The downhole fluid samples may thereafter be expelled through a port (not shown) into the wellbore or may be sent to one or more fluid collecting chambers 226, and/or 228. In turn, the fluid collecting chambers 226, and/or 228 may receive and retain the downhole fluid samples for subsequent testing at the surface or a testing facility.

In the illustrated example, the fluid sensing unit 220 may comprise a spectral analysis system 250 having a spectrometer cell (not shown) through which the obtained downhole fluid samples may flow. The spectral analysis system 250 may be configured to determine partial densities of compounds of the downhole fluid extracted from the formation F, such as a partial density of one or more of methane, ethane, propane, butane, hexane, heptane, octane, hydrogen sulfide, water, carbon dioxide, nitrogen, sulfate, helium, and combinations thereof, as further described herein. For example, the spectral analysis system 250 may be of a type described in FIG. 4. It should be appreciated however that the fluid sensing unit 220 may include any combination of conventional and/or future-developed spectral analysis systems within the scope of the present disclosure.

The telemetry module 210 may comprise a downhole control system 212 communicatively coupled to the electrical control and data acquisition system 206. In the illustrated example, the electrical control and data acquisition system 206 and/or the downhole control system 212 may be configured to control the fluid admitting assembly 216 and/or the extraction of fluid samples from the formation F, for example the pumping rate of pump 221. The electrical control and data acquisition system 206 and/or the downhole control system 212 may further be configured to analyze and/or process data obtained, for example, from fluid sensing unit 220, store and/or communicate measurement or processed data to the surface for subsequent analysis. The electrical control and data acquisition system 206 and/or the downhole control system 212 may still further be configured to implement one or more aspects of the methods described herein. For example, the electrical control and data acquisition system 206 and/or the downhole control system 212 may comprise one or more computer readable media (not shown) configured to store instructions thereon. The instructions, when executed, may cause the spectral analysis system 250 to expose the downhole fluid to an electromagnetic radiation and measure a spectrum of radiation absorption by the downhole fluid. Further, the electrical control and data acquisition system 206 and/or the downhole control system 212 may comprise at least one processor (not shown) operatively coupled to one or more computer readable media (not shown) configured to store instructions thereon. The instructions, when executed, may cause the at least one processor to identify an absorption peak of a compound in the measured spectrum, determine a first parameter indicative of an absorption by the downhole fluid in the identified absorption peak, determine second and third parameters indicative of absorptions by the downhole fluid essentially out of the identified absorption peak, determine a weighted combination of the second and third parameters; and determine a partial density of the compound from a difference between the weighted combination and the first parameter.

Figure 7A:
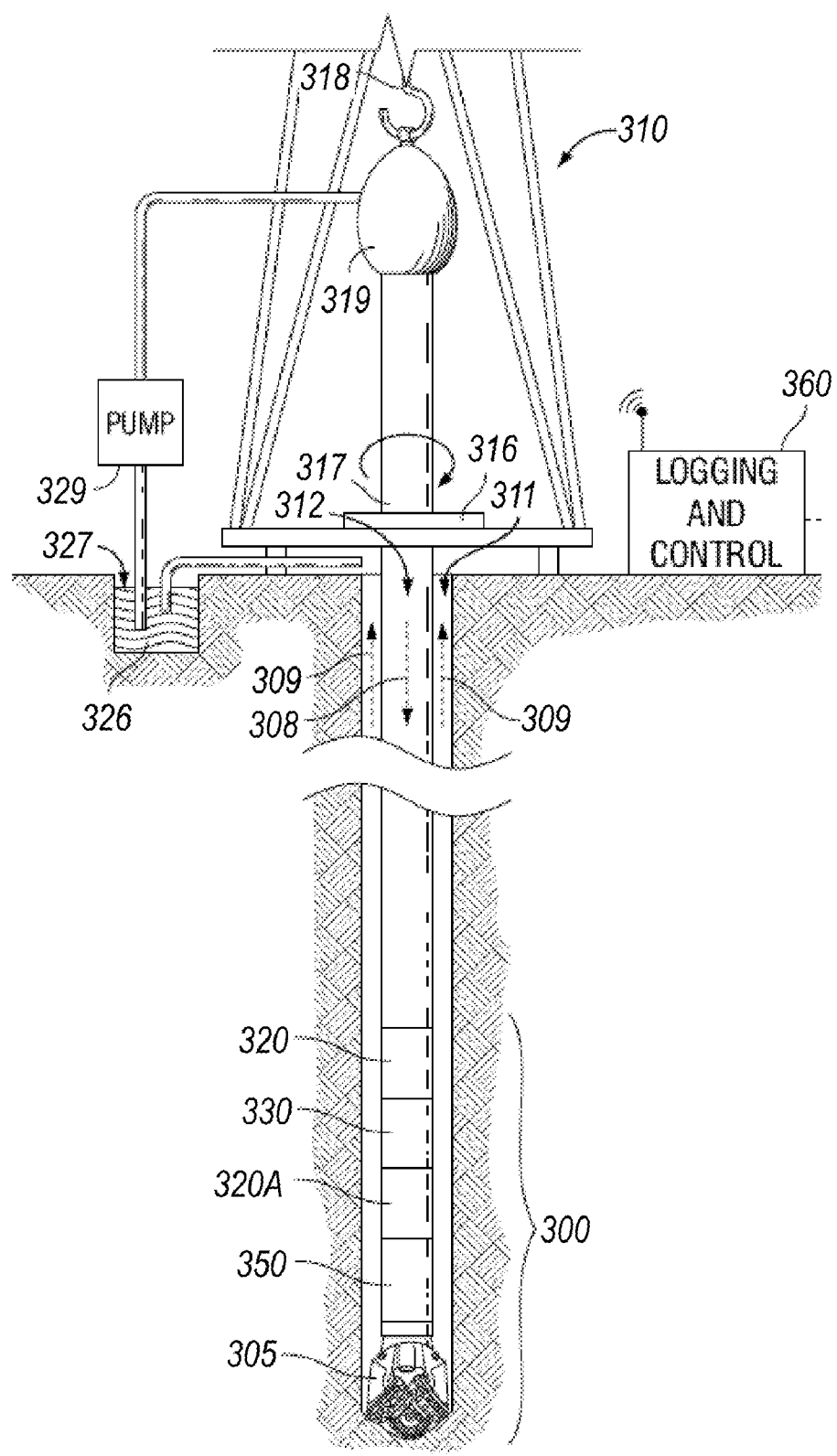
FIG. 7A is a schematic view of another fluid analysis system according to one or more aspects of the present disclosure.
Figure 7B:
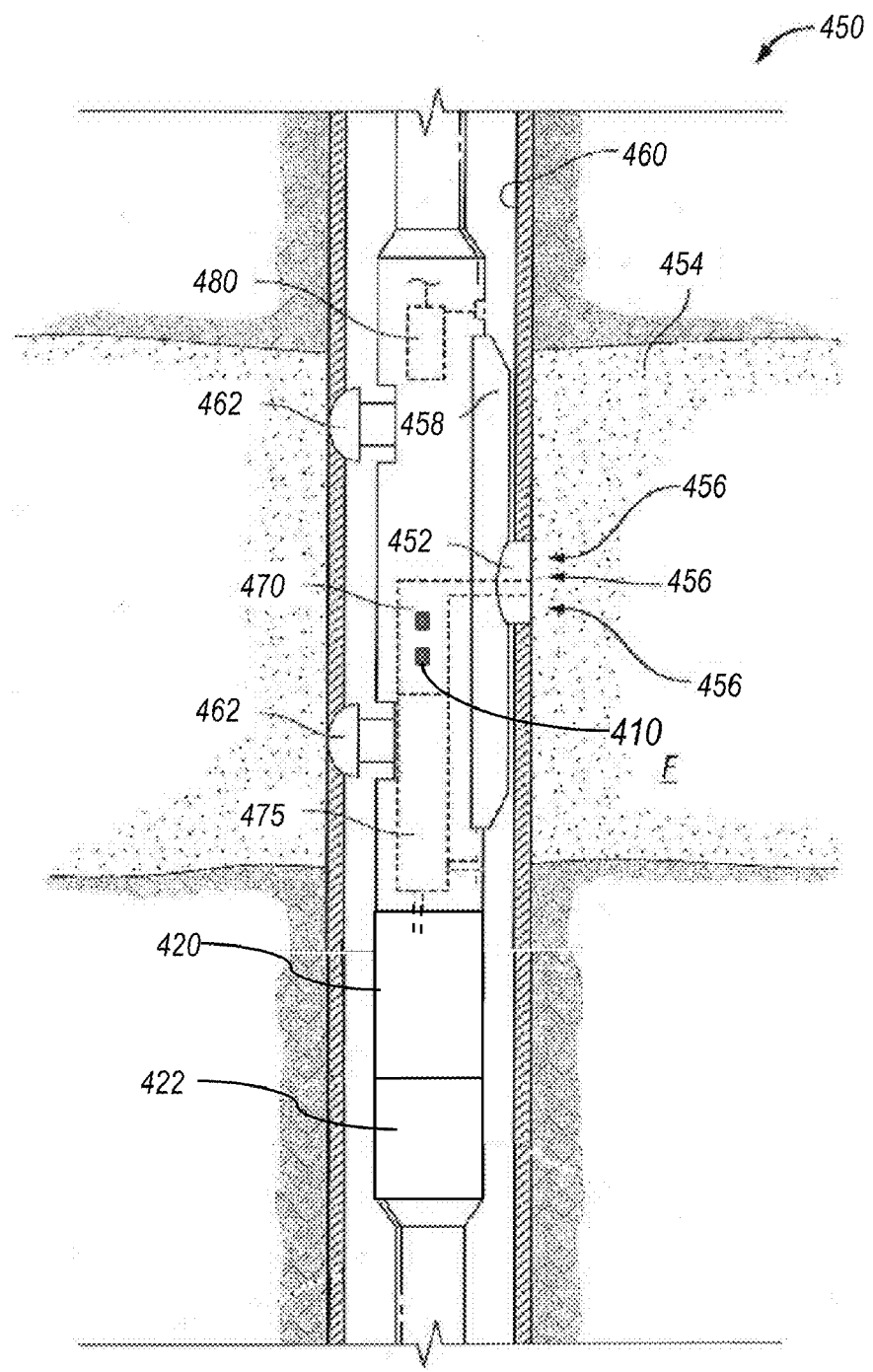
FIG. 7B is a schematic view of a portion of the fluid analysis system shown in FIG. 7A.

Turning to FIGS. 7A and 7B, an example well site system according to one or more aspects of the present disclosure is shown. The well site may be situated onshore (as shown) or offshore. The well site system of FIGS. 7A and 7B may be configured to perform at least a portion of the method 500 shown in FIG. 5. For example, the well site system may comprise a sampling-while drilling device that may be configured to determine partial densities of compounds present in downhole fluid samples extracted from a subterranean formation F into which a wellbore 311 has been drilled.

Referring to FIG. 7A, the wellbore 311 is drilled through subsurface formations by rotary drilling in a manner that is well known in the art. However, the present disclosure also contemplates others examples used in connection with directional drilling apparatus and methods, as will be described hereinafter.

A drill string 312 is suspended within the wellbore 311 and includes a bottom hole assembly ("BHA") 300 proximate the lower end thereof. The BHA 300 includes a drill bit 305 at its lower end. The surface portion of the well site system includes platform and derrick assembly 310 positioned over the wellbore 311, the assembly 310 including a rotary table 316, kelly 317, hook 318 and rotary swivel 319. The drill string 312 may be rotated by the rotary table 316, which is itself operated by well known means not shown in the drawing. The rotary table 316 engages the kelly 317 at the upper end of the drill string 312. As is well known, a top drive system (not shown) could alternatively be used instead of the kelly 317 and rotary table 316 to rotate the drill string 312 from the surface. The drill string 312 may be suspended from the hook 318. The hook 318 may be attached to a traveling block (also not shown), through the kelly 317 and the rotary swivel 319 which permits rotation of the drill string 312 relative to the hook 318.

In the example of FIG. 7A, the surface system further includes drilling fluid ("mud") 326 stored in a tank or pit 327 formed at the well site. A pump 329 delivers the drilling fluid 326 to the interior of the drill string 312 via a port in the swivel 319, causing the drilling fluid 326 to flow downwardly through the drill string 312 as indicated by the directional arrow 308. The drilling fluid 326 exits the drill string 312 via water courses, or nozzles ("jets") in the drill bit 305, and then circulates upwardly through the annulus region between the outside of the drill string and the wall of the wellbore, as indicated by the directional arrows 309. In this well known manner, the drilling fluid 326 lubricates the drill bit 305 and carries formation cuttings up to the surface, whereupon the drilling fluid 326 may be cleaned and returned to the pit 327 for recirculation. It should be noted that in some implementations, the drill bit 305 may be omitted and the bottom hole assembly 300 may be conveyed via tubing or pipe.

The bottom hole assembly 300 of the illustrated example may include a logging-while-drilling (LWD) module 320, a measuring-while-drilling (MWD) module 330, a rotary-steerable directional drilling system and hydraulically operated motor 350, and the drill bit 305.

The LWD module 320 may be housed in a special type of drill collar, as is known in the art, and may contain one or a plurality of known types of well logging instruments. It will also be understood that more than one LWD module may be employed, e.g., as represented at 320A. (References, throughout, to a module at the position of LWD module 320 may alternatively mean a module at the position of LWD module 320A as well.) The LWD module 320 typically includes capabilities for measuring, processing, and storing information, as well as for communicating with the MWD 330. In the shown embodiment, the LWD module 320 includes a fluid sampling device as will be further explained hereinafter.

The MWD module 330 may also be housed in a special type of drill collar, as is known in the art, and may contain one or more devices for measuring characteristics of the drill string and drill bit. The MWD module 330 further includes an apparatus (not shown) for generating electrical power for the downhole portion of the well site system. Such apparatus typically includes a turbine generator powered by the flow of the drilling fluid 326, it being understood that other power and/or battery systems may be used while remaining within the scope of the present disclosure. In the present example, the MWD module 330 may include one or more of the following types of measuring devices: a weight-on-bit measuring device, a torque measuring device, a vibration measuring device, a shock measuring device, a stick slip measuring device, a direction measuring device, and an inclination measuring device. Optionally, the MWD module 330 may further comprise an annular pressure sensor, and a natural gamma ray sensor. The MWD module 330 typically includes capabilities for measuring, processing, and storing information, as well as for communicating with a logging and control unit 360. For example, the MWD module 330 and the logging and control unit 360 may communicate information either ways (i.e., uplinks and/or downlinks) via systems sometimes referred to as mud pulse telemetry (MPT), and/or wired drill pipe (WDP) telemetry. In some cases, the logging and control unit 360 may include a controller having an interface configured to receive commands from a surface operator.

A sampling-while-drilling device 450 (e.g., similar to the LWD tool 320 in FIG. 7A) is shown in FIG. 7B. The sampling-while-drilling device 450 of FIG. 7B may be of a type described, for example, in U.S. Patent Application Publication No. 2008/0156486, incorporated herein by reference. However, other types of sampling-while-drilling devices may be used to implement the sampling-while-drilling device 450 or portions thereof within the scope of the present disclosure.

Referring to FIG. 7B, the sampling-while-drilling device 450 may be provided with a stabilizer that may include one or more blades 458 configured to engage a wall 460 of the wellbore 311 (in FIG. 7A). The sampling-while-drilling device 450 may be provided with a plurality of backup pistons 462 to assist in applying a force to push and/or move the sampling-while-drilling device 450 against the wall 460 of the wellbore 311 (in FIG. 7A).

A fluid admitting assembly 452 may extend from the stabilizer blade 158 of the sampling-while-drilling device 450. The fluid admitting assembly 452 may be configured to selectively seal off or isolate selected portions of the wall 460 of the wellbore 311 (in FIG. 7A) to fluidly couple to an adjacent formation F. Once the fluid admitting assembly 452 fluidly couples to the adjacent formation F, various measurements may be conducted on the adjacent formation F, for example, a pressure parameter may be measured by performing a pretest. Also, a pump 475 may be used to draw downhole fluid 454 from the formation F into the sampling-while-drilling device 450 in a direction generally indicated by arrows 456. The fluid may thereafter be expelled through a port (not shown) into the wellbore, or it may be sent to one or more fluid collecting chambers 420 and 422, which may receive and retain the formation fluid for subsequent testing at the surface or a testing facility.

The sampling-while-drilling device 450 may include a fluid sensing unit 470, and configured to measure properties of the fluid samples extracted from the formation F. In the illustrated example, the fluid sensing unit 470 may comprise a spectral analysis system 410 having a spectrometer cell (not shown) through which the obtained fluid samples may flow. The spectral analysis system configured to determine partial densities of compounds of the downhole fluid extracted from the formation F, such as a partial density of one or more of methane, ethane, propane, butane, hexane, heptane, octane, hydrogen sulfide, water, carbon dioxide, nitrogen, sulfate, helium, and combinations thereof, as further described herein. For example, the spectral analysis system 410 may be of a type described in FIG. 4. It should be appreciated however that the fluid sensing unit 470 may include any combination of conventional and/or future-developed spectral analysis systems within the scope of the present disclosure.

A downhole control system 480 may be configured to control the operations of the sampling-while-drilling device 450. In particular, the downhole control system 180 may be configured to control the extraction of fluid samples from the formation F, for example, via the pumping rate of the pump 475. The downhole control system 480 may further be configured to analyze and/or process data obtained, for example, from fluid sensing unit 470 or other downhole sensors (not shown), store and/or communicate measurement or processed data to the surface for subsequent analysis. The downhole control system 480 may still further be configured to implement one or more aspects of the methods described herein. For example, downhole control system 480 may comprise one or more computer readable media (not shown) configured to store instructions thereon. The instructions, when executed, may cause the spectral analysis system 410 to expose the downhole fluid to an electromagnetic radiation and measure a spectrum of radiation absorption by the downhole fluid. Further, downhole control system 480 may comprise at least one processor (not shown) operatively coupled to one or more computer readable media (not shown) configured to store instructions thereon. The instructions, when executed, may cause the at least one processor to identify an absorption peak of a compound in the measured spectrum, determine a first parameter indicative of an absorption by the downhole fluid in the identified absorption peak, determine second and third parameters indicative of absorptions by the downhole fluid essentially out of the identified absorption peak, determine a weighted combination of the second and third parameters; and determine a partial density of the compound from a difference between the weighted combination and the first parameter.

While the wireline tool 200 (in FIG. 6) and the sampling-while-drilling device 450 (in FIG. 7B) are depicted having one fluid admitting assembly, a plurality of fluid admitting assemblies may alternatively be provided on the wireline tool 200 and/or the sampling-while-drilling device 450. In particular, the fluid admitting assembly of the wireline tool 200 (in FIG. 6) and/or the sampling-while-drilling device 450 (in FIG. 7B) may be implemented with a guarded or focused fluid admitting assembly, for example, as shown in U.S. Pat. No. 6,964,301, incorporated herein by reference. In these cases, the fluid sensing unit 220 (in FIG. 6) and/or the fluid sensing unit 470 (in FIG. 7B) may be fluidly coupled to a central inlet of the guarded or focused fluid admitting assembly.

Figure 8:
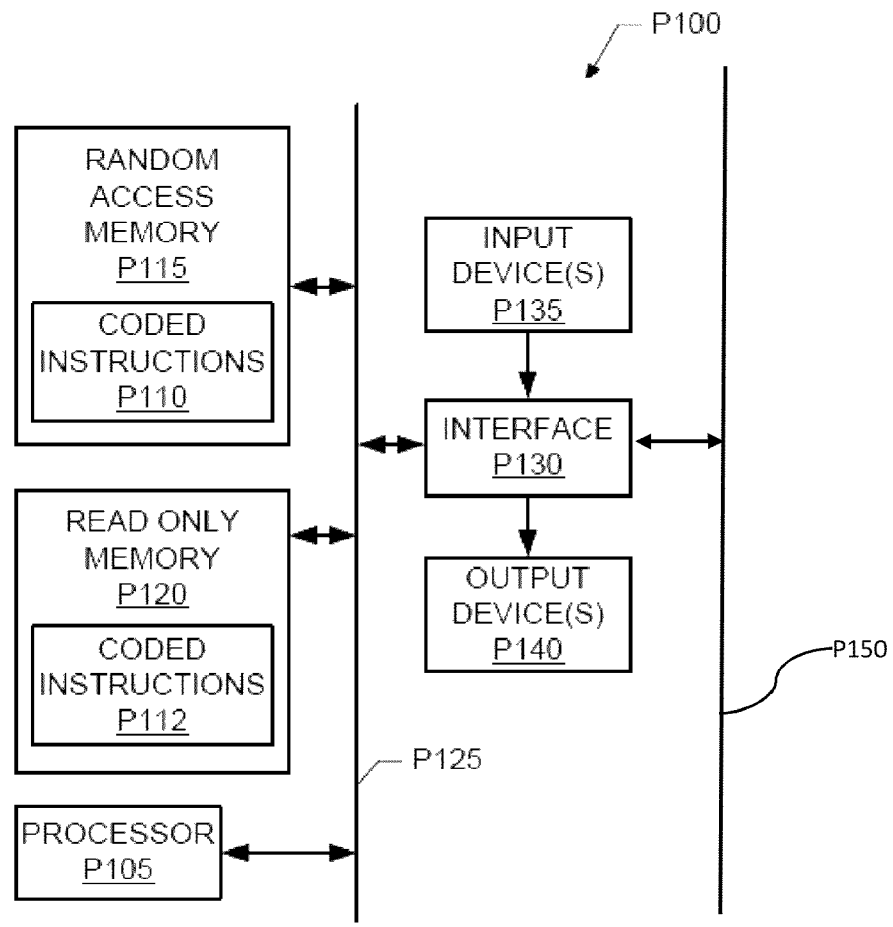
FIG. 8 is a schematic view of at least a portion of a computing system according to one or more aspects of the present disclosure.

FIG. 8 is a schematic view of at least a portion of an example computing system P100 that may be programmed to carry out all or a portion of the example method 500 of FIG. 5. The computing system P100 may be used to implement all or a portion of the electronics and processing system 206 of FIG. 6, the downhole control system 212 of FIG. 6, the logging and control unit 306 of FIG. 7A, and/or the downhole control system 480 of FIG. 7B. Thus, the computing system P100 shown in FIG. 8 may be used to implement surface components (e.g., components located at the Earth's surface) and/or downhole components (e.g., components located in a downhole tool) of a distributed computing system.

The computing system P100 may include at least one general-purpose programmable processor P105. The processor P105 may be any type of processing unit, such as a processor core, a processor, a microcontroller, etc. The processor P105 may execute coded instructions P110 and/or P112 present in main memory of the processor P105 (e.g., within a RAM P115 and/or a ROM P120). When executed, the coded instructions P110 and/or P112 may cause the spectral analysis system of FIG. 4, the well site system of FIG. 6 and/or the well site system of FIGS. 7A and 7B to perform at least a portion of the method 500 of FIG. 5, among other things.

The processor P105 may be in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown). The memory P115, P120 may be used to store, for example, measured spectra of downhole fluids (e.g., optical density values corresponding to a plurality of wavelengths), partial densities of one or more compounds in downhole fluids, total density values of downhole fluids, and/or weight percentage of one or more compounds in downhole fluids.

The computing system P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The example input device P135 may be used to, for example, collect data from the example spectral analysis system 100 of FIG. 4, the spectral analysis system 250 of FIG. 6, and/or the spectral analysis system 410 of FIG. 7B, and/or. The example output device P140 may be used to, for example, display, print and/or store on a removable storage media one or more of measured spectra of downhole fluids (e.g., optical density values corresponding to a plurality of wavelengths), partial densities of one or more compounds in downhole fluids, total density values of downhole fluids, and/or weight percentage of one or more compounds in downhole fluids. Further, the interface circuit P130 may be connected to a telemetry system P150, including, for example, the multi-conductor cable 204 of FIG. 6, the mud pulse telemetry (MPT) and/or the wired drill pipe (WDP) telemetry system of FIG. 7A. The telemetry system P150 may be used to transmit measurement data, processed data and/or instructions, among other things, between the surface and downhole components of the distributed computing system.

In view of all of the above and FIGS. 1 to 8, it should be readily apparent to those skilled in the art that the present disclosure provides a method of analyzing a downhole fluid, comprising exposing the downhole fluid to an electro-magnetic radiation, measuring a spectrum of radiation absorption by the downhole fluid, identifying an absorption peak of a compound in the measured spectrum, the compound having a partial density in the downhole fluid, determining a first parameter indicative of an absorption by the downhole fluid in the identified absorption peak using the measured spectrum, determining second and third parameters indicative of absorptions by the downhole fluid essentially out of the identified absorption peak using the measured spectrum, determining a weighted combination of the second and third parameters. and determining the partial density of the compound from a difference between the weighted combination and the first parameter. Exposing the downhole fluid to the electro-magnetic radiation may comprise exposing the downhole fluid to light in the infrared region. Exposing the downhole fluid to the electromagnetic radiation may comprise exposing the downhole fluid to light in the visible region. Identifying the absorption peak of the compound in the measured spectrum may comprise identifying an absorption peak of at least one of methane, ethane, propane, butane, hexane, heptane, octane, hydrogen sulfide, water, carbon dioxide, nitrogen, sulfate, helium, and a combination thereof. Identifying the absorption peak of the compound in the measured spectrum may comprise identifying an absorption peak of hydrogen sulfide. Identifying the absorption peak of the compound in the measured spectrum may comprise identifying an absorption peak of carbon dioxide. Determining the first parameter indicative of the absorption by the downhole fluid in the identified absorption peak may comprise determining an optical density of the downhole fluid at a first wavelength located in the identified absorption peak. Determining the second and third parameters indicative of the absorptions by the downhole fluid essentially out of the identified absorption peak may comprise determining a reference optical density of the downhole fluid at a second wavelength substantially shorter than the first wavelength. The first and the second wavelengths may differ by at least 20 nanometers. Determining the second and third parameters indicative of the absorptions by the downhole fluid essentially out of the identified absorption peak may comprise determining a reference optical density of the downhole fluid at a second wavelength substantially longer than the first wavelength. The first and the second wavelength differ by at least 20 nanometers. Determining the second and third parameters indicative of the absorptions by the downhole fluid essentially out of the identified absorption peak may comprise determining a first reference optical density of the downhole fluid at second wavelength substantially shorter than the first wavelength and a second reference optical density of the downhole fluid at third wavelength substantially longer than the first wavelength. Determining the weighted combination of the second and third parameters may comprise extrapolating the second and third parameters along a line of fixed slope to determine a reference parameter, and determining the partial density of the compound from the difference between the weighted combination and the first parameter may comprise determining the partial density of the compound from the difference between the reference parameter and the first parameter. The method may further comprise lowering a downhole tool in a well penetrating a subterranean formation, the downhole tool including an electro-magnetic radiation source, and exposing the downhole fluid to the electromagnetic radiation may be performed in situ. Lowering the downhole tool in the well penetrating the subterranean formation may be performed via one of a tubing, a drill pipe, and a wireline. The method may further comprise determining a total density of the downhole fluid. The method may further comprise determining a weight percentage of the compound from the determined partial density of the compound, and the determined total density of the downhole fluid.

The present disclosure also provides a method of analyzing a downhole fluid, comprising exposing the downhole fluid to a light source in the infrared region, measuring a spectrum of optical absorption by the downhole fluid, identifying an absorption peak of hydrogen sulfide in the measured spectrum, the hydrogen sulfide having a partial density in the downhole fluid, determining an optical density of the downhole fluid at a first wavelength located in the identified absorption peak using the measured spectrum, determining a first reference optical density of the downhole fluid at a second wavelength substantially shorter than the first wavelength and a second reference optical density of the downhole fluid at a third wavelength substantially longer than the first wavelength using the measured spectrum, determining a weighted combination of the first and second reference optical densities, and determining the partial density of hydrogen sulfide from a difference between the weighted combination and the optical density of the downhole fluid at the first wavelength. The first wavelength may be selected in at least one of the wavelength ranges between 1150 and 1180 nanometers, between 1280 and 1370 nanometers, and between 1530 and 1615 nanometers. The method may further comprise determining a hydrocarbon partial density and a carbon dioxide partial density in the downhole fluid.

The present disclosure also provides a method of analyzing a downhole fluid, comprising exposing the downhole fluid to a light source in the infrared region, measuring a spectrum of optical absorption by the downhole fluid, identifying an absorption peak of carbon dioxide in the measured spectrum, the carbon dioxide having a partial density in the downhole fluid, determining an optical density of the downhole fluid at a first wavelength located in the identified spectral absorption peak using the measured spectrum, determining a first reference optical density of the downhole fluid at a second wavelength substantially shorter than the first wavelength and a second reference optical density of the downhole fluid at a third wavelength substantially longer than the first wavelength using the measured spectrum, determining a weighted combination of the first and second reference optical densities, and determining the partial density of carbon dioxide from a difference between the weighted combination and the optical density of the downhole fluid at the first wavelength. The first wavelength may be selected at approximately 2010 nanometers. The second wavelength may be selected at approximately 1985 nanometers, and the third wavelength may be selected at approximately 2040 nanometers.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method of analyzing a downhole fluid, comprising:
 exposing the downhole fluid to an electro-magnetic radiation;
 measuring a spectrum of radiation absorption by the downhole fluid;
 identifying in the measured spectrum an absorption peak of a compound, the compound having a partial density in the downhole fluid;
 determining a first parameter indicative of an absorption by the downhole fluid in the identified absorption peak using the measured spectrum;
 determining second and third parameters indicative of absorptions by the downhole fluid essentially out of the identified absorption peak using the measured spectrum;
 determining a weighted combination of the second and third parameters; and
 determining the partial density of the compound from a difference between the weighted combination and the first parameter.

2. The method of claim 1 wherein exposing the downhole fluid to the electromagnetic radiation comprises exposing the downhole fluid to light in the infrared region.

3. The method of claim 1 wherein identifying the absorption peak of the compound in the measured spectrum comprises identifying an absorption peak of at least one of methane, ethane, propane, butane, hexane, heptane, octane, hydrogen sulfide, water, carbon dioxide, nitrogen, sulfate, helium, and a combination thereof.

4. The method of claim 1 wherein identifying the absorption peak of the compound in the measured spectrum comprises identifying an absorption peak of hydrogen sulfide.

5. The method of claim 1 wherein identifying the absorption peak of the compound in the measured spectrum comprises identifying an absorption peak of carbon dioxide.

6. The method of claim 1 wherein determining the first parameter indicative of the absorption by the downhole fluid in the identified absorption peak comprises determining an optical density of the downhole fluid at a first wavelength located in the identified absorption peak.

7. The method of claim 6 wherein determining the second and third parameters indicative of the absorptions by the downhole fluid essentially out of the identified absorption peak comprises determining a reference optical density of the downhole fluid at a second wavelength substantially different from the first wavelength.

8. The method of claim 6 wherein determining the second and third parameters indicative of the absorptions by the downhole fluid essentially out of the identified absorption peak comprises determining a first reference optical density of the downhole fluid at a second wavelength substantially shorter than the first wavelength and a second reference optical density of the downhole fluid at a third wavelength substantially longer than the first wavelength.

9. The method of claim 1 wherein determining the weighted combination of the second and third parameters comprises extrapolating the second and third parameters along a line of fixed slope to determine a reference parameter, and wherein determining the partial density of the compound from the difference between the weighted combination and the first parameter comprises determining the partial density of the compound from the difference between the reference parameter and the first parameter.

10. The method of claim 1 further comprising lowering a downhole tool in a well penetrating a subterranean formation, the downhole tool including an electromagnetic radiation source, and wherein exposing the downhole fluid to the electro-magnetic radiation is performed in situ.

11. The method of claim 10 wherein lowering the downhole tool in the well penetrating the subterranean formation is performed via one of a tubing, a drill pipe, and a wireline.

12. The method of claim 1 further comprising determining a total density of the downhole fluid.

13. The method of claim 12 further comprising determining a weight percentage of the compound from the determined partial density of the compound and the determined total density of the downhole fluid.

14. A method of analyzing a downhole fluid, comprising:
exposing the downhole fluid to a light source in the infrared region;
measuring a spectrum of optical absorption by the downhole fluid;
identifying in the measured spectrum an absorption peak of hydrogen sulfide, the hydrogen sulfide having a partial density in the downhole fluid;
determining an optical density of the downhole fluid at a first wavelength located in the identified absorption peak using the measured spectrum;
determining a first reference optical density of the downhole fluid at a second wavelength substantially different from the first wavelength and a second reference optical density of the downhole fluid at a third wavelength substantially different from the first wavelength using the measured spectrum;
determining a weighted combination of the first and second reference optical densities; and
determining the partial density of hydrogen sulfide from a difference between the weighted combination and the optical density the downhole fluid at the first wavelength.

15. The method of claim 14 wherein the first wavelength is in at least one of the wavelength ranges of between 1150 and 1180 nanometers, between 1280 and 1370 nanometers, and between 1530 and 1615 nanometers.

16. The method of claim 14 wherein the second wavelength is substantially shorter than the first wavelength and the third wavelength substantially longer than the first wavelength.

17. The method of claim 14 further comprising determining a hydrocarbon partial density and a carbon dioxide partial density in the downhole fluid.

18. A method of analyzing a downhole fluid, comprising:
exposing the downhole fluid to a light source in the infrared region;
measuring a spectrum of optical absorption by the downhole fluid;
identifying in the measured spectrum an absorption peak of carbon dioxide, the carbon dioxide having a partial density in the downhole fluid;
determining an optical density of the downhole fluid at a first wavelength located in the identified spectral absorption peak using the measured spectrum;
determining a first reference optical density of the downhole fluid at a second wavelength substantially shorter than the first wavelength and a second reference optical density of the downhole fluid at a third wavelength substantially longer than the first wavelength using the measured spectrum;
determining a weighted combination of the first and second reference optical densities; and
determining the partial density of carbon dioxide from a difference between the weighted combination and the optical density of the downhole fluid at the first wavelength.

19. The method of claim 18 wherein the first wavelength is approximately 2010 nanometers.

20. The method of claim 18 wherein the second wavelength is approximately 1985 nanometers, and wherein the third wavelength is approximately 2040 nanometers.

* * * * *